F. W. ROBERTSHAW.
WATER HEATER.
APPLICATION FILED MAR. 27, 1908.
935,408.
Patented Sept. 28, 1909.
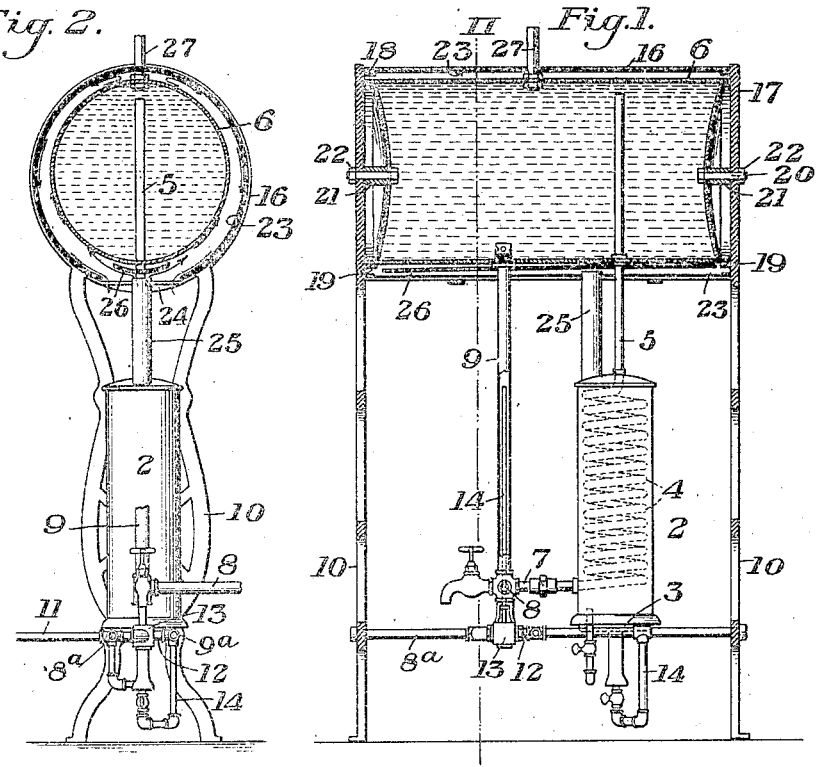
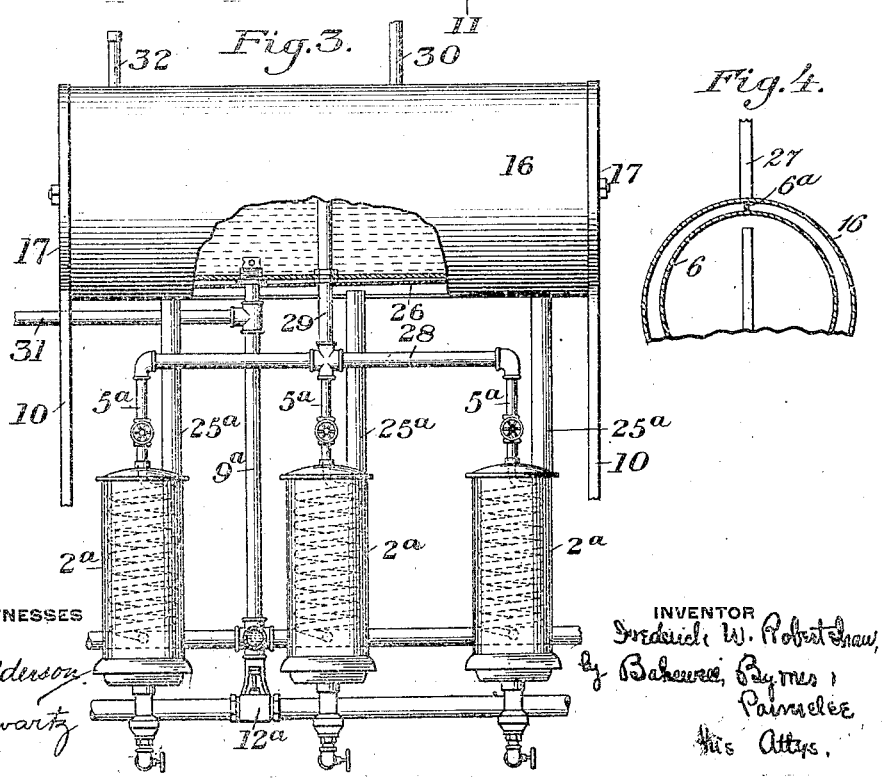
WITNESSES
R. A. Balderson
W. W. Swartz
INVENTOR
Frederick W. Robertshaw,
by Bakewell, Byrnes,
Parmelee
his Attys.

UNITED STATES PATENT OFFICE

FREDERICK W. ROBERTSHAW, OF PITTSBURG, PENNSYLVANIA.

WATER-HEATER.

935,408.     Specification of Letters Patent.     Patented Sept. 28, 1909.

Application filed March 27, 1908. Serial No. 423,767.

*To all whom it may concern:*

Be it known that I, FREDERICK W. ROBERTSHAW, of Pittsburg, Allegheny county, Pennsylvania, have invented a new and useful Water-Heater, of which the following is a full, clear, and exact description, reference being had to the accompanying drawings, forming part of this specification, in which—

Figure 1 is a view partly in side elevation and partly in vertical section of one form of water heater embodying my invention; Fig. 2 is a cross-section of the same on the line II—II of Fig. 1; and Fig. 3 is a side elevation, partly broken away showing another embodiment of my invention. Fig. 4 is a detail view showing a modification.

My invention has relation to water heaters of that class in which fluid fuel, such as gas or oil, is used; and is designed to provide a heater of this class which is arranged to utilize to the greatest possible extent the heat generated by the combustion of the fuel, the products of combustion, after having imparted to the heating surface all the heat of which such surface is capable of absorbing, being utilized to their further fullest heating capacity by being passed to and around a reservoir in a manner to prevent radiation of heat from the reservoir and to cause the latter to absorb a maximum amount of heat from such gases. In this manner a maximum heating effect may be obtained with a minimum consumption of fuel.

A further object of my invention is to provide a heater which shall be uniform in its action to such an extent that a given consumption of fuel can be depended upon to heat a like volume of water to a given temperature in the manner more fully hereinafter described.

My invention is applicable to hot water heaters for domestic and other purposes, and also to hot water heating systems, for all of which purposes it is extremely efficient and economical.

Heaters embodying my invention are provided with a water drum, boiler, or reservoir, connected by circulating pipes with one or more burner chambers containing heating coils, or other heating surfaces, within which the water is heated by the action of the burners and from which it passes upwardly into the drum or reservoir.

The supply of fuel for the burners is preferably regulated by a valve controlled by a thermostat placed in the water return connection to the heater, and to suitable connections to chamber or chambers, and whereby just sufficient combustion is maintained at the burners to keep the water at the desired temperature.

The water drum or reservoir is provided with an outer surrounding shell, or jacket, preferably of non-heat-conducting character, and forming around the drum a heating and heat-confining chamber having upwardly and inwardly converging outer walls, and which is closed except for an opening or openings at its lower portion. Into this chamber the hot air and gases from the burners are conducted by means of flue connections; and by the form and arrangement of the chambers, these hot gases are caused to first pass upwardly therein at opposite sides of the drum in contact with the outer surface of the same until they reach the upper portion of the chamber, where they are turned back as they are cooled, and thence pass downwardly along the inner wall of the outer shell and escape to the atmosphere at the lower opening or openings. In this manner the hot gases are retained in the chamber until they have parted with substantially all their heat, which is utilized in heating the drum.

The heating chamber, in which the drum is supported, has no outlet flue connection, the only escape for the gases being at its lower portion through the opening or openings referred to; and herein lies one of the most important features of my invention.

I have found that when a flue is employed, not only is a large portion of the contained heat carried off and lost, but the efficiency of the heater varies from time to time with variations in the nature and action of the flue draft such as always occur in flues subject to atmospheric conditions.

The precise nature of my invention will be best understood by reference to the accompanying drawings, in which I have shown two different embodiments thereof, and which will now be described, it being premised, however, that various changes may be made therein by those skilled in the art without departing from the spirit and scope of my invention as defined in the appended claims.

Referring first to that form of my invention which is shown in Figs. 1 and 2, and which is particularly applicable to hot water heaters for domestic purposes, the numeral 2 designates a burner or heating chamber having a burner 3 at its lower portion.

The particular embodiment of my invention shown is designed to use gas as a fuel, but the invention is equally applicable for oil or other fluid fuels.

Placed within the chamber 2, which is preferably of sheet metal, are the heating coils 4, or other heating surfaces, which are connected at their upper ends by a pipe 5 leading to the upper portion of a water drum or reservoir 6. The lower ends of the heating coils are connected by a pipe 7 with a cold water inlet pipe 8 and with a return pipe 9 leading upwardly in the lower portion of the drum or reservoir 6. The burner chamber 2 is shown as supported upon the two longitudinal pipes $8^a$ and $9^a$, which connect the side legs 10 of the supporting frame. These pipes are closed at their ends, and the pipe $8^a$ is connected with a gas supply pipe 11. A connection from the pipe $8^a$ supplies the pilot light of the burner 3. The pipes $8^a$ and $9^a$ are connected by a cross-pipe 12, in which is placed a control valve 13, whose position is regulated by a thermostat 14 placed in the return pipe 9. This valve and thermostat may be of any suitable character, such for instance, as that described and claimed in my Patent No. 864,263, of August 27th, 1907. The gas which passes through this thermostatically controlled valve enters the pipe $9^a$ and is conveyed to the burner by the pipe 14.

The drum 6 is eccentrically supported within an outer jacket or shell 16, which consists of end plates 17 which may be cast integral with or secured to the supporting legs 10, and which have on their inner faces circular ribs 18 which support the shell 16 or jacket proper. The end plates 17 are also provided with the curved lugs 19 on their inner faces, upon which the end portions of the drum 6 rest. Bolts 20 tie the drum to the end plates 17, these bolts passing through the sleeves or spacers 21 which are placed between the inner surfaces of the end plates and the concaved ends of the drum, and the bolts being secured by nuts 22 at their outer ends. The outer shell or jacket 16 is preferably of non-heat-conducting character, or is provided with a non-heat-conducting lining 23, of asbestos, or other suitable material. This shell or jacket has a longitudinal opening 24 at its lower portion, through which extends a flue 25 for conducting the hot air and gases from the burner chamber 2 into the lower portion of the heating and heat-confining chamber formed by the outer shell or jacket.

26 designates a shallow trough, which extends longitudinally underneath the lower portion of drum 6 for the purpose of catching any condensation drip therefrom. This trough may be slightly inclined toward one end to facilitate its discharge.

27 designates the hot water off-take from the drum 6.

The operation is as follows:—The water is heated in the usual manner in passing through the coils 4 and is delivered into the upper portion of the drum 6. So long as the off-take pipe 27 is closed, there will be more or less constant circulation from the drum through the return pipe to the heating coils and back to the drum, thus maintaining the water in the drum at the desired temperature, the thermostatically controlled valve operating to maintain just sufficient combustion at the burners for this purpose. The hot air and gases from the burner chamber rise through the flue 25 into the lower portion of the heating chamber, where they are diverted by the drip trough 26, and pass upwardly at opposite sides of the drum 6, tending to hug the surface of said drum as they pass upwardly. Owing to the eccentric position of the drum within the outer shell or jacket, the inner walls of the heating chamber converge inwardly toward the drum so that the gases are compressed in volume as their temperature is reduced and are forced inwardly into contact with the drum. As the two currents of gases meet at the upper portion of the chamber, they are turned backwardly, as indicated by the arrows in Fig. 1, and thus pass downwardly along the inner surface of the outer shell until they finally escape to the atmosphere at the lower longitudinal opening.

If desired, the heating chamber might be divided at the top of the drum by a baffle wall or partition as shown at $6^a$ in Fig. 4, although this is not found necessary in practice, since there will be an up and down circulation of the gases at each side of the drum in the manner described even with this baffle wall or partition omitted. In this manner the gases are retained within the heating chamber until they have parted with substantially all their heat which has been utilized in maintaining the temperature of the water in the drum. The outer shell or jacket with its non-heat-conducting lining also prevents loss of heat by radiation from the drum. In the ordinary heater with an exposed drum, there is a radiating surface of considerably larger area than the heating surface, and there is consequently a constant loss by radiation, which I prevent by the means described.

The arrangement of the thermostat in the return pipe 9 causes the gas inlet controlling valve to respond quickly to any changes in temperature of the water.

As hereinbefore stated, there is no outlet flue provided for the heating chamber surrounding the drum, the only escape for the gases being into the atmosphere at the lower opening or openings; and as a matter of fact, the provision of such a flue would defeat largely the beneficial results of my invention, for the reasons before described. By providing the room or compartment in which the heater is placed with any ordinary ventilating means, the heater may be operated without a perceptible odor or other inconvenience resulting from the escape of the gases to the atmosphere. The amount of gas which is consumed to maintain the water at the proper temperature when the heater is not being drawn upon, is very small, and the gases are cooled to such an extent before they escape from the heating chamber that their presence is in fact scarcely to be noted in the surrounding atmosphere.

In Fig. 3 I have shown my invention applied to a hot-water heating system. The construction and arrangement of the drum for this purpose is in all respects the same as shown in Figs. 1 and 2, but a plurality of burner chambers $2^a$ (3 in the present instance) are employed, each of which has a flue $25^a$ leading upwardly into the heating chamber surrounding the drum. Any desired number of these heaters may be employed according to the service required. The horizontal position of the drum permits of an almost unlimited increase of the heating coils or other heating surfaces. I preferably connect the hot water pipes $5^a$ leading from the upper ends of the heating coils to a single pipe or header 28, from which a pipe 29 leads upwardly into the boiler, thus avoiding the necessity for piercing the drum for a number of separate pipes. Although each of the heaters may be provided with a separate return pipe, and with a separate thermostatically controlled gas valve, I have shown a single return pipe $9^a$, to which the lower ends of all the heating coils are connected, with a single thermostatic valve $12^a$, which controls the admission of gas to all three burners.

30 designates the hot water pipe of the heating system, and 31 the return pipe. 32 is an air vent having a removable cap which can be taken off in filling the boiler in the first instance.

The advantages of my invention will be apparent from what has been already said; since it provides a heater which is extremely economical in its consumption of fuel, and which is uniform in its action. It will be noted that cold water is introduced to the heater at the lowest point in the circulating system, so that a natural circulation of the water through the drum and heating coils can readily take place.

Various changes may be made in the details of my invention; thus the drum and its outer shell or jacket, instead of being supported in the manner shown, may obviously be suspended from overhead, or supported in any other desired manner. While I may conveniently use the gas distributing pipes as a means for supporting the burners as shown and described, yet it is obvious that these may be supported in any other way and the gas distributed to the burners by any suitable arrangement of pipes. The water drum may be of various sizes and shapes and may be supported within the outer shell or jacket in any suitable manner.

What I claim is:—

1. A water heater having a burner for fluid fuel, a water reservoir having surfaces which diverge upwardly from its bottom, a closed circulating system for the reservoir, including heating surfaces which are exposed to the action of the burner, and a casing or shell surrounding the reservoir and forming heating and heat-confining chambers at opposite sides of the reservoir, said chambers being without outlet connections and closed except at the lower portion, and means for conducting the gases from the burner into the lower portion of said casing or shell after they have passed over said heating surfaces, the casing or shell having a bottom opening through which the gases escape after they have made an up and down pass in each of said chambers; substantially as described.

2. A water heater having a burner for fluid fuel, a water reservoir having surfaces which diverge upwardly from its bottom, a closed circulating system for the reservoir connected thereto at different levels at the hot and cold ends of said system, said system including heating surfaces which are exposed to the action of the burner, and a casing or shell surrounding the reservoir and forming heating and heat-confining chambers at opposite sides of the reservoir, said chambers being without outlet connections and closed except at the lower portion, and means for conducting the gases from the burner into the lower portion of said casing or shell after they have passed over said heating surfaces, the casing or shell having a bottom opening through which the gases escape after they have made an up and down pass in each of said chambers; substantially as described.

3. A water heater comprising a heater proper, a fluid fuel burner for said heater, a horizontally supported water drum above the heater and connected therewith by circulating pipes, a casing or shell surrounding said drum and forming heating and heat-confining chambers at opposite sides thereof, said chambers being closed except at the lower portion, and a flue for conducting the gases from the burner, after they have passed over the heater proper, into the lower portion of the casing or shell, the bottom of the drum acting to divert the gas upwardly into the said chambers whereby they make up and down passes in each of said chambers, the bottom of the casing having an escape opening to permit of the escape of the gases after they have made such up and down passes; substantially as described.

4. A water heater comprising a heater proper, a burner for heating the same, a water reservoir supported above the heater proper and connected thereto by circulating pipes, a casing or shell surrounding the water reservoir and forming heating and heat-confining chambers at opposite sides thereof, said chambers being of decreasing width toward the top and entirely closed except at the lower portion, and a flue for conducting the gases from the burner, after they have passed over the heater proper, into the lower portion of the casing or shell, the bottom of the drum acting to divert the gas upwardly into the said chambers whereby they make up and down passes in each of said chambers, the bottom of the casing having an escape opening to permit of the escape of the gases after they have made such up and down passes; substantially as described.

5. In a water heater, a heater proper, a burner for the same, a water drum supported horizontally above the burner, a casing or shell surrounding said drum and forming heating and heat-confining chambers at the opposite sides of said drum, the lateral walls of the casing or shell converging inwardly toward the upper portion of the drum and thereby decreasing the area of the upper portions of the chambers, said chambers being closed except at their lower portions, and means for conveying the waste gases from the heater proper into the lower portion of the shell or casing and causing them to make up and down passes in said chambers and then escape at the lower portion of the shell or casing; substantially as described.

6. A water heater comprising a plurality of heating coils, an inclosing casing therefor, burner means for supplying heat to said coils, a water reservoir above the coils and connected by circulating pipes to opposite ends of the coils, a shell surrounding the reservoir and forming heating and heat-confining chambers at opposite sides thereof, said chambers being closed at the top and open at their lower portions, and a flue leading from the casing of the heating coils into the lower portion of the shell, whereby the gases from said flue make up and down passes in said chambers at opposite sides of the reservoir and then escape at the lower portion thereof; substantially as described.

7. A water heater having a burner for fluid fuel, a water reservoir having surfaces which diverge upwardly from its bottom, a closed circulating system for the reservoir, including heating surfaces which are exposed to the action of the burner, and a casing or shell surrounding the reservoir and forming heating and heat-confining chambers at opposite sides of the reservoir, said chambers being without outlet connections and closed except at the lower portion, and means for conducting the gases from the burner into the lower portion of said casing or shell after they have passed over said heating surfaces, the casing or shell having a bottom opening through which the gases escape after they have made an up and down pass in each of said chambers, and the return circulating connection from the reservoir to the heater proper having means controlled by the water therein for controlling the amount of fuel supplied to the burner; substantially as described.

8. In a water heater, a supporting frame having legs which carry end plates at their upper portions, a horizontal water drum supported by said end plates, a surrounding shell or jacket for the drum also supported by the end plates and forming around the drum a heating and heat-confining chamber which is closed except at its lower portion, circulating pipes for said drum including a heating coil, a burner for heating the coil, gas distributing pipes for the burner forming a support for the burner, and also braces for the frame, and means for conducting the hot gases from the burner into the lower portion of the heating and heat-confining chamber and for causing them to make up and down passes in such chamber at opposite sides of the drum; substantially as described.

In testimony whereof, I have hereunto set my hand.

FREDERICK W. ROBERTSHAW.

Witnesses:
GEO. H. PARMELEE,
M. V. KIEHL.